(12) United States Patent  (10) Patent No.: US 8,412,903 B2
Rodgers  (45) Date of Patent: Apr. 2, 2013

(54) METHOD AND SYSTEM FOR MANAGING SECURE CODE LOADING IN PC-SLAVE DEVICES

(75) Inventor: Stephane Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/112,801

(22) Filed: May 20, 2011

(65) Prior Publication Data

US 2011/0219242 A1 Sep. 8, 2011

Related U.S. Application Data

(63) Continuation of application No. 12/015,648, filed on Jan. 17, 2008, now Pat. No. 7,966,465.

(51) Int. Cl.
*G06F 12/00* (2006.01)

(52) U.S. Cl. ......... 711/163; 711/105; 711/147; 711/173

(58) Field of Classification Search .................. None
See application file for complete search history.

(56) References Cited

U.S. PATENT DOCUMENTS

| 5,146,575 | A | 9/1992 | Nolan, Jr. | |
|---|---|---|---|---|
| 7,299,365 | B2 * | 11/2007 | Evans | 713/189 |
| 7,694,151 | B1 | 4/2010 | Johnson et al. | |
| 2003/0051090 | A1 | 3/2003 | Bonnett et al. | |
| 2006/0126422 | A1 * | 6/2006 | Takagi et al. | 365/232 |
| 2006/0288235 | A1 * | 12/2006 | Goto | 713/190 |

* cited by examiner

*Primary Examiner* — Shawn X Gu
(74) *Attorney, Agent, or Firm* — Sterne, Kessler, Goldstein & Fox P.L.L.C.

(57) ABSTRACT

A secure processor in a PC-slave device manages secure loading of execution code and/or data, which is stored, in encrypted form, in a PC hard-drive. The secure processor causes decryption of the execution code and/or data by the PC-slave device, and storage of the decrypted execution code and/or data in a restricted portion of a memory that is dedicated for use by the PC-slave device, with the restricted portion of the dedicated memory being only accessible by the PC-slave device. The secure processor validates decrypted execution code and/or data. The secure processor blocks operations of a main processor in the PC-slave device during secure loading of execution code and/or data, and discontinues that blocking after validating the decrypted execution code and/or data. The secure processor stores encryption keys that are utilized during decryption of the encrypted execution code and/or data.

40 Claims, 3 Drawing Sheets

METHOD AND SYSTEM FOR MANAGING SECURE CODE LOADING IN PC-SLAVE DEVICES

CROSS-REFERENCE TO RELATED APPLICATIONS/INCORPORATION BY REFERENCE

This application is a continuation of U.S. patent application Ser. No. 12/015,648, filed on Jan. 17, 2008, now issued as U.S. Pat. No. 7,966,465.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to secure processing systems. More specifically, certain embodiments of the invention relate to a method and system for secure code encryption for PC-slave devices.

BACKGROUND OF THE INVENTION

In an increasingly security-conscious world, protecting access to information and/or to systems from unwanted discovery and/or corruption is a major issue for both consumers and businesses.

The growth of system connectivity has been one of the major developments in recent years. Fewer and fewer systems are operating as stand-alone devices, and most of today's systems are increasingly becoming elements of complex networks. This growth in networking allows improved performance and increased flexibility. However, with this growth in system distribution, system security, and protection against unwanted access and/or corruption, has become a major concern for systems owners and/or operators.

As PCs become greater points of convergence in the home of the future, more and more applications may use such systems as central points for distribution of data, for example with video and/or audio content, or for processing of said data. However, an IP protection problem arises for companies which produce PC plug-in cards. As these companies must ship binary software code, Field Programmable Gate Array (FPGA) binaries, or other "soft IP" with their products, the most usual location for storing said binaries may be the PC hard-drive. Such storage may expose these binaries to potential security threats and/or malicious access where the security of the host systems may be breached. These binaries and/or software IP packages may be visible to any of thousands or millions of people, who can use any standard binary viewing tool to view this IP, simply by examining their hard drives. Also, the vendor may want to store on the hard-drive sensitive parameters or other non-execution type data files which should not be available to the general public.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for secure code encryption for PC-slave devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for secure code encryption for PC-slave devices. A PC-slave device, in a PC system, may load and decrypt an execution code, which may be stored in a PC hard-drive. The execution code may be encrypted, while stored in the PC hard-drive, to improve security. The PC-slave device may utilize a dedicated memory, which may comprise an external direct random memory access (DRAM), and the dedicated memory may be utilized during secure code loading. The dedicated memory may be partitioned into an accessible region and a restricted region that may only be accessible by the PC-slave device. The encrypted execution code may be loaded, from the PC hard-drive, into the accessible region of the dedicated memory. The PC-slave device may decrypt the execution code, utilizing internally stored encryption keys, for example, and may store the decrypted execution in the restricted region of the dedicated memory. The decrypted execution code may first be validated, and may then be executed from the restricted region in the dedicated memory. A main processor in the PC-slave device may be reset when secure code loading is initiated, and may be taken out of reset after validation of the decrypted execution code is performed, for example. The partitioning of the dedicated memory, into accessible and restricted regions, may be performed dynamically during secure code loading. The PC-slave device may comprise a dedicated secure processor that may enable performing and/or managing secure code loading for the PC-slave main processor. The PC-slave dedicated secure processor may enable managing memory partitioning and/or access, storage and/or loading of encryption keys, managing decryption of the execution code, and/or resetting the PC-slave device during secure code loading.

Figure 1:
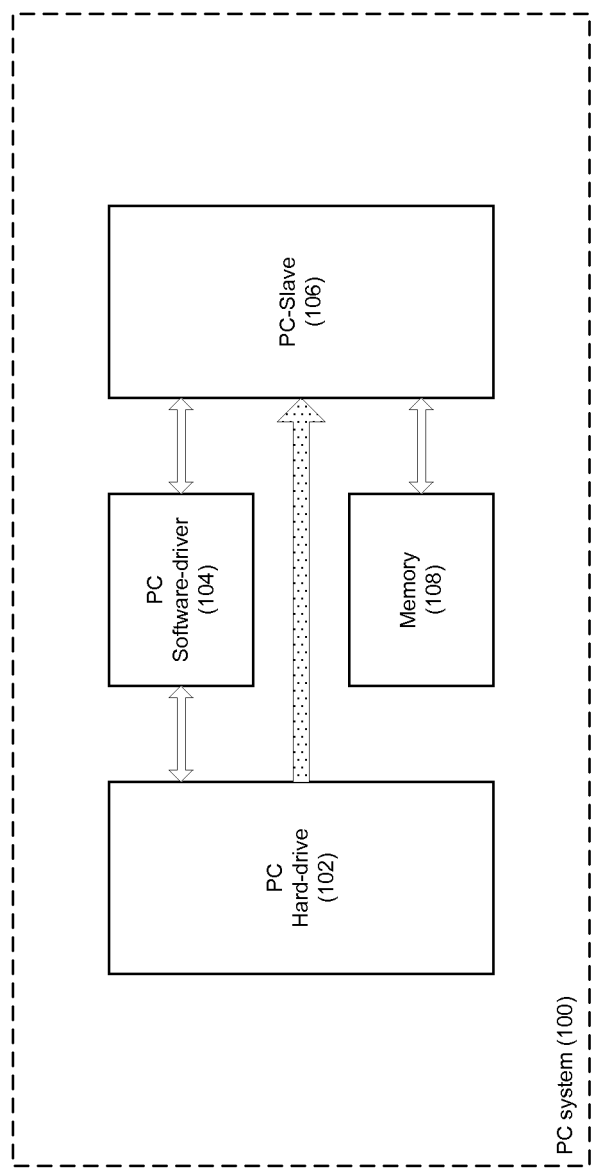
FIG. 1 is a block diagram illustrating an exemplary PC system supporting a PC-slave device, which may utilize execution code stored in a PC hard drive, in accordance with an embodiment of the invention.

FIG. 1 is a block diagram illustrating an exemplary PC system supporting a PC-slave device, which may utilize execution code stored in a PC hard drive, in accordance with an embodiment of the invention. Referring to FIG. 1, there is shown a personal computer (PC) system 100, a PC hard-drive 102, a PC software driver 104, a PC-slave device 106, and a PC-slave memory 108.

The PC system 100 may comprise the PC hard-drive 102, the PC software driver 104, and a plurality of devices that may be utilized via a PC communication bus comprising, for example, a Peripheral Component Interconnect (PCI) bus or any variant of the PCI bus such as PCI express (PCI-e), a universal serial bus (USB), and/or other type of bus. These devices may comprise, for example, the PC-slave device 106, which may utilize a memory device, for example the PC-slave memory 108. The PC system 100 may also comprise suitable logic, circuitry, and/or code that may enable performing various operations, which may comprise data manipulation and/or storage, calculations, enabling inputting and/or outputting of various types of data, and/or performing execution of applications or programs. The PC system 100 may comprise, for example, a general-purpose computer such as a desktop, a laptop, and/or workstation. Alternatively, the PC system 100 may comprise a special-purpose computer system that may be optimized for performing a specific type of functionality, for example, a TV set-top box.

The PC hard-drive 102 may comprise suitable logic, circuitry, and/or code that may enable non-volatile storage of data and/or programs in the PC system 100. The PC software driver 104 may comprise suitable logic, circuitry, and/or code that may enable management of the PC hard-drive 102. The PC software driver 104 may enable interactions between subsystems and/or devices in the PC system 100 and the PC hard-drive 102, to enable retrieval and/or storage of data and/or code in the PC hard-drive 102.

The PC-slave device 106 may comprise suitable logic, circuitry, and/or code that may enable performing one or more specific operations within the PC system 100. For example, the PC-slave device 106 may comprise a plug-in card that may be plugged into a motherboard host computer, for example the PC system 100, via a PCI slot, for example, to enable performing optional and/or optimized functionality in the host computer. The PC-slave device 106 may comprise a sound card, a network card, and/or a network card, for example. The PC-slave device 106 may be enabled to communicate with other components and/or subsystems in the PC system 100 via a communication bus, which may comprise, for example, a Peripheral Component Interconnect (PCI) bus or any variant thereof, a USB, or other type of bus.

The PC-slave memory 108 may comprise suitable logic, circuitry, and/or code that may enable storage and/or retrieval of data and/or code, which may be utilized by the PC-slave device 106, for example. In this regard, the PC-slave memory 108 may comprise different memory technologies, including, for example, dynamic random access memory (DRAM).

A process for secure handling of PC-slave devices to ensure security of slave-devices code and/or data that may be stored within PC systems may be provided. A first step of such secure process may be to encrypt the slave-devices code and/or data prior to shipment, then decrypt the data and/or code via the PC software, via the PC software driver 104 for example. However, such approach may be insufficient because PC software may be very easy to attack, and/or may be exposed to a large community of potential hackers. Therefore, any solution which relies on PC software protection is considered a very low security system. A stronger method of encryption is desirable, wherein the PC software may configure the encryption system, but access to the decrypted data and/or code may be shielded within the PC-slave device 106 from remaining components, devices, and/or subsystems in the PC system 100.

In operation, PC-slave device 106 may utilize an execution code that may be stored in the PC hard-drive 102. For example, the PC-slave device 106 may comprise a wireless network card that may be plugged into the PC system 100 to enable wireless connectivity. The execution code may be loaded from the PC hard-drive 102, into the PC-slave device 106, to enable execution of necessary operations and/or functionality. The PC-slave device 106 may be enabled to utilize PCI interface to interact with the PC hard-drive 102 either directly or indirectly. Additionally, the PC-slave device 106 may utilize the PC-slave memory 108, during operations performed in the PC-slave device 106, for storage and/or retrieval of code and/or data that may utilized in the PC-slave device 106.

To improve security of the PC system 100, the execution code stored in the PC hard-drive 102 may be encrypted. Encryption of execution code, of the PC-slave device 106, may prevent and/or reduce exposure of the execution code in instances where there may be security breaches of the PC system 100. During decryption of the encrypted execution code, encryption keys that enable performing the decryption may be utilized. Decryption of the encrypted execution code may be performed via the PC software driver 104, which may then copy the decrypted execution code to the PC-slave memory 108, for example. This may reduce security risks that may result from storing unencrypted execution code directly in the PC hard-drive 102. The PC software driver 104 and/or the PC hard-drive 102 may embed the decryption keys. Consequently, the execution code may still be vulnerable to security breaches since both the encrypted execution code, via the PC hard-drive 102, and the encryption keys, via the PC hard-drive 102 and/or the PC software driver 104, may be accessible during security breaches. Therefore, a more robust solution is desirable. Alternatively, the PC-slave device 106 may be enabled to perform decryption of the encrypted execution code internally, wherein the encryption keys and/or the decrypted execution code may be shielded from access by hackers even where such hackers may be able to access and/or breach the PC hard-drive 102 and/or the PC software driver 104. Thus, potential exposure of the execution code may be reduced during potential security breaches.

Figure 2:
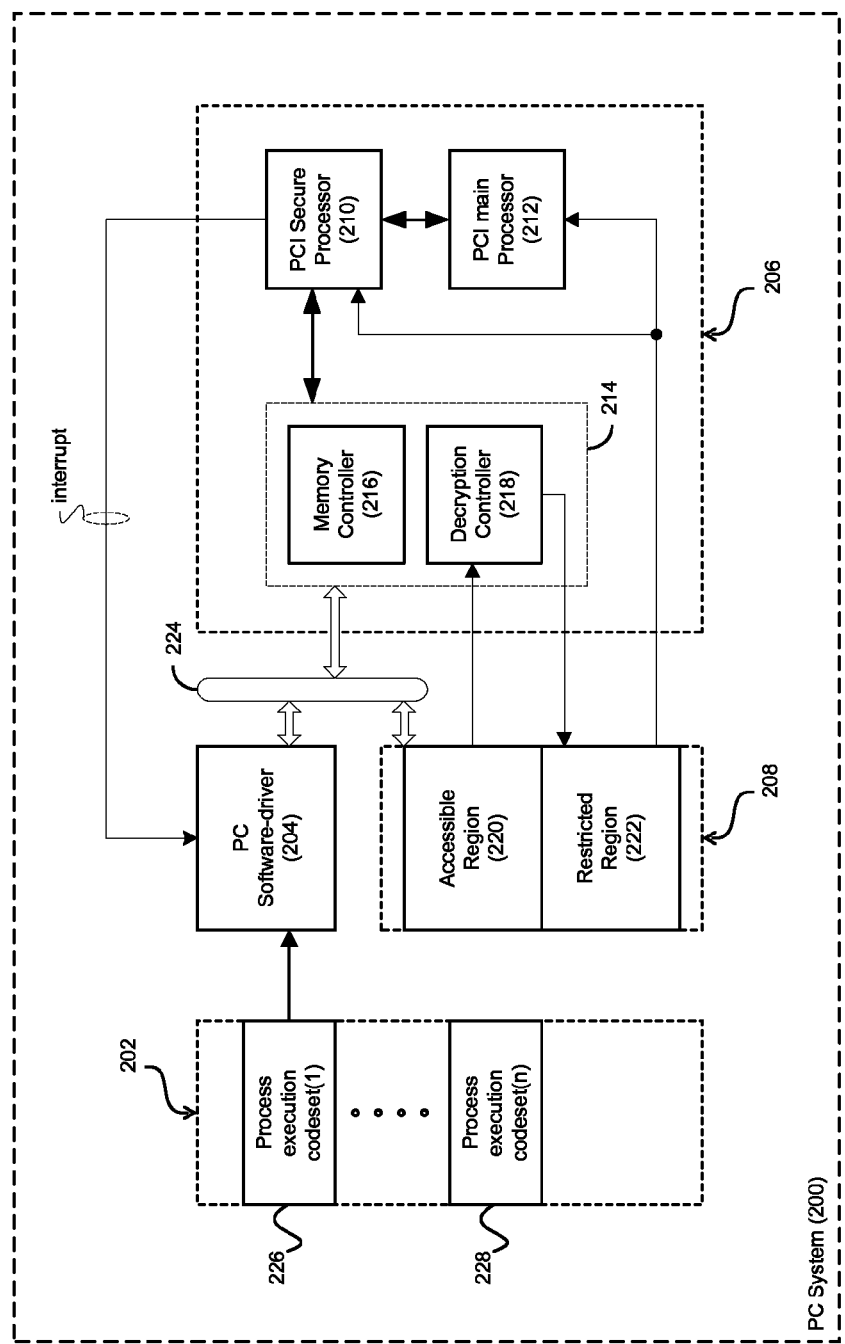
FIG. 2 is a block diagram illustrating an exemplary PC system supporting a PCI-slave device, which may be loaded securely with encrypted code stored in a PC hard drive, via restricted memory region in dedicated DRAM, in accordance with an embodiment of the invention.

FIG. 2 is a block diagram illustrating an exemplary PC system supporting a PCI-slave device, which may be loaded securely with encrypted code stored in a PC hard drive, via restricted memory region in dedicated DRAM, in accordance with an embodiment of the invention. Referring to FIG. 2, there is shown a personal computer (PC) system 200, a PC hard-drive 202, a PC software driver 204, a Peripheral Component Interconnect (PCI) slave device 206, a Dynamic Random Access Memory (DRAM) 208, a PCI secure processor 210, a PCI main processor 212, a secure direct memory access (DMA) unit 214, a memory controller 216, a decryption controller 218, a accessible memory region 220, a restricted memory region 222, a PCI bus 224, and plurality of processor execution codesets 226, . . . , 228.

The PC system 200 may be substantially similar to the PC system 200, as described in FIG. 1. The PC system 200 may comprise the PC hard-drive 202, the PC software driver 204, the PCI-slave device 206, the PCI memory 208, and the PCI bus 224. The PC system 200 may also comprise suitable logic, circuitry, and/or code that may enable performing various operations, which may comprise data manipulation and/or storage, calculations, enabling inputting and/or outputting of various types of data, and/or performing applications or programs. The PC system 200 may comprise, for example, a general-purpose computer such as a desktop, a laptop, and/or workstation. Alternatively, the PC system 200 may comprise a special-purpose computer system that may be optimized for performing a specific type of functionality, for example, a TV set-top box.

The PC hard-drive 202 may be comprised substantially similar to the PC hard-drive 202, as described in FIG. 1. The PC software driver 204 may be substantially similar to the PC software driver 204, as described in FIG. 1. The PC software driver 204 may enable interactions between subsystems and/or devices in the PC system 200 and the PC hard-drive 202, to enable retrieval and/or storage of data and/or code in the PC hard-drive 202. The PC hard-drive may comprise the plurality of processor execution codesets 226, . . . , 228, and each of the execution codesets may be encrypted while stored in the PC hard-drive 202 for improved security.

The PCI memory 208 may comprise suitable logic, circuitry, and/or code that may enable storage and/or retrieval of data and/or code, which may be utilized by the PCI-slave device 206, for example. In this regard, the PCI memory 208 may comprise different memory technologies, including, for example, dynamic random access memory (DRAM). The PCI memory 208 may be enable partitioning of storage space within the PCI memory 208, and may also enable restricting access to one or more of partitions within the PCI memory 208 to subsystems in the PC system 200 other than the PCI-slave device 206. For example, the PCI memory 208 may be partitioned into the accessible region 220 and the restricted region 222, wherein the restricted region 222 may only be accessible by the PCI-slave device 206, and the accessible region 220 may also be accessible by the PC software driver 204, for example.

The PCI-slave device 206 may comprise the PCI secure processor 212, the PCI main processor 212, the secure direct memory access (DMA) unit 214, the memory controller 216, and the decryption controller 218. The PCI-slave device 206 may also comprise suitable logic, circuitry, and/or code that may enable performing one or more specific operations in the PC system 200. For example, the PCI-slave device 206 may comprise a plug-in card that may be plugged into a motherboard host computer, for example the PC system 200, via a PCI slot to enable performing optional and/or optimized functionality in the host computer. The PCI-slave device 206 may comprise a sound card, a network card, and/or a network card, for example.

The PCI main processor 212 may comprise suitable logic, circuitry, and/or code that may enable processing operations that may be performed by the PCI-slave device 206. The invention may not be limited to a specific processor, but may comprise for example, a general purpose processor, a specialized processor or any combination of suitable hardware, firmware, software and/or code, which may be enabled to provide secure code loading in a PCI-slave device. The PCI secure processor 210 may comprise suitable logic, circuitry, and/or code that may enable managing and/or controlling operations performed by the PCI-slave device 206 during secure code loading. For example, the PCI secure processor 210 may utilize the secure DMA unit 214 to enable utilizing restricted region 222 in the PCI memory 208 during execution code decryption; and the PCI secure processor 210 may enable blocking operations by the PCI main processor 212 during secure code loading.

The secure direct memory access (DMA) unit 214 may comprise the memory controller 216, the decryption controller 218, and suitable logic, circuitry, and/or code that may enable management of PCI memory 208 and/or performing of decryption of execution code in the PCI-slave device 206. The memory controller 216 may comprise suitable logic, circuitry, and/or code that may enable management of PCI memory 208. For example, the memory controller 216 may enable partitioning of the PCI memory 208 into the accessible region 220 and/or the restricted region 222. Additionally, the memory controller 216 may enable restricting access to the accessible region 220 and/or the restricted region 222. For example, the memory controller 216 may restricted access of the PC software driver 204 to the accessible region 220 in the PCI memory 208, wherein the PC software driver 204 may only write into and/or read from, via the PCI bus 224, the accessible region 220. The decryption controller 218 may comprise suitable logic, circuitry, and/or code that may enable performing of decryption of execution code in the PCI-slave device 206. For example, the decryption controller 218 may utilize encryption keys, which may be provided by the PCI secure processor 210 for example, to decrypt encrypted execution code that may be read from the PCI memory 208.

The PCI bus 224 may comprise suitable logic, circuitry, and/or code that may enable PCI-enabled systems and/or devices to interact via PCI interface. For example, the PCI bus 224 may enable interactions between the PC software driver 204, the PCI-slave device 206, and/or the PCI memory 208.

In operation, PCI-slave device 206 may enable performing a dedicated and/or optimized functionality in the PC system 200. For example, the PCI-slave device 206 may comprise a wireless network card that may be plugged into the PC system 200 to enable wireless connectivity for a specific wireless interface. The PCI-slave device 206 may utilize a processor execution codeset that may be stored in the PC hard-drive 202, for example the processor execution codeset 226. To facilitate loading of the processor execution codeset 226 into the PCI-slave device 206, the PCI-slave device 206 may be enabled to utilize PCI interface to interact with the PC hard-drive 202, via the PC software driver 204 for example. Furthermore, to improve security of the PC system 200, and/or the security of the PCI-slave device 206, the processor execution codeset 226 stored in the PC hard-drive 202 may be encrypted, wherein decryption of the encrypted processor execution codeset 226 may be performed during secure code loading. Additionally, encryption keys that may enable performing the decryption may be utilized during decryption of the encrypted processor execution codeset 226. Encryption of processor execution codeset 226 may prevent and/or reduce vulnerability of processor execution codeset 226 in instances where there may be breaches of the PC system 200.

In an embodiment of the invention, the PCI-slave device 206 may perform the decryption of the encrypted processor execution codeset 226, wherein the decrypted processor execution codeset 226 may not be accessible external to the PCI-slave device 206. For example, the PCI-slave device 106 may utilize the PCI secure processor 210, the secure DMA unit 214, and/or the PCI memory 208, to decrypt and load processor execution codeset 226 without exposing the decrypted processor execution codeset 226 to other subsystems and/or devices in the PC system 200. For example, to initiate the secure code loading, the PCI secure processor 210 may first reset the PCI main processor 212 to prevent and/or block it from performing any operations during the secure code loading. The PCI secure processor 212 may then enable the secure DMA unit 214 to partition the PCI memory 208, via the memory controller 216, to the accessible region 220, which may be accessible by the PC software driver 204, and the restricted region 222, which may only be accessible by the PCI-slave device 206. The PCI secure processor 210 may also comprise encryption keys, which may be utilized to perform decryption of the encrypted processor execution codeset 226, and may load the encryption keys into the decryption controller 218 at this point.

Once the PCI memory 208 is partitioned and/or the encryption keys are loaded into the decryption controller 218, the PCI secure processor 210 may issue an interrupt into the PC software driver 204. The PC software driver 204 may then read out, from the PC hard-drive 202, the encrypted processor execution codeset 226. The PC software driver 204 and/or the memory controller 216 may enable loading the encrypted processor execution codeset 226, via the PCI bus 224, into the accessible region 220 of the PCI memory 208. The decryption controller 218 may then copy out the encrypted processor execution codeset 226 from the accessible region 220, and may perform decryption operation, utilizing loaded encryption keys from the PCI secure processor 210 for example, and may load the decrypted code into the restricted region 222. Consequently, potential exposure of the processor execution codeset 226 may be reduced during potential security breaches because the PC software driver 204 may be unable to access the decrypted processor execution codeset 226 once it is stored back into the restricted region 222. The PCI secure processor 210 may validate the decrypted processor execution codeset 226, and in instances where the decrypted processor execution codeset 226 may be determined to be valid, the PCI secure processor 210 may take the PCI main processor 212 from reset. Once the PCI main processor 212 is released from reset, the PCI main processor 212 may load the decrypted processor execution codeset 226 from the restricted region, and/or may utilize the processor execution codeset 226 to perform operations and/or functionality that may requested, in the PC system 200, via the PCI-slave device 206.

While the invention may be described in FIG. 2 based on embodiment utilizing PCI bus 224 and the PCI-slave device 206, the invention may also be embodied substantially the same way in PC systems that may utilize other types of internal buses and/or slave devices. Additionally, while the invention may have be described with regard to slave device execution code, the invention may be utilized substantially the same way with non-code data files that may be stored encrypted in a PC system hard drive and encrypted internally within a slave device that may comprise substantially similar components as the PCI-slave device 206.

Figure 3:
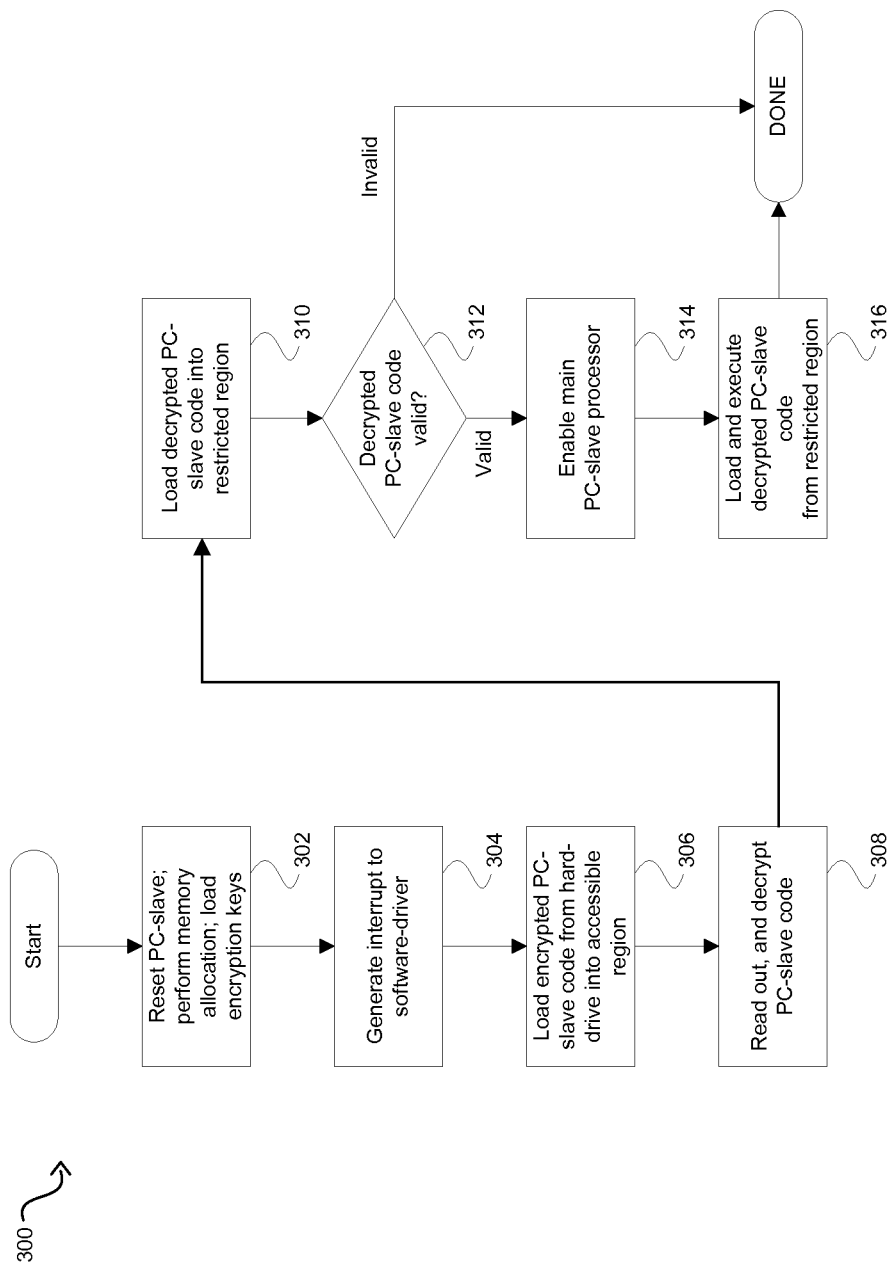
FIG. 3 is an exemplary flow diagram illustrating a secure code encryption in a PC-slave device, in accordance with an embodiment of the invention.

FIG. 3 is an exemplary flow diagram illustrating a secure code encryption in a PC-slave device, in accordance with an embodiment of the invention. Referring to FIG. 3, there is shown a flow chart 300 comprising a plurality of exemplary steps, which may enable, secure code loading of a PC-slave device, for example the PCI-slave device 206 in the PC system 200.

In step 302, PC-slave device secure code loading may be initiated, wherein a PC-slave main processor reset, memory allocation, and/or loading of encryption keys may be performed. For example, the PCI secure processor 210 may resets the PCI main processor 212 to prevent it and/or block it from performing any operations during secure code loading. The PCI secure processor 212 may then partition the PCI memory 208, via the memory controller 216, to the accessible region 220, which may be accessible via the PCI bus 224, and the restricted region 222, which may only be accessible by the PCI-slave device 206. Encryption keys, which may be utilized to perform code decryption, may also be loaded, into the decryption controller 218 for example, from the PCI secure processor 210. The exemplary steps may then proceed to step 304.

In step 304, an interrupt may be generated in the PC system to enable loading of decrypted PC-slave device execution code. For example, once the PCI memory 208 is partitioned and/or the encryption keys are loaded into the decryption controller 218, an interrupt may be generated and/or sent to the PC software driver 204. The exemplary steps may then proceed to step 306. In step 306, the encrypted PC-slave device execution code may be read from the PC hard-drive. For example, the PC software driver 204 may read out, from the PC hard-drive 202, the encrypted processor execution codeset 226. The PC software driver 204 and/or the memory controller 216 may enable loading the encrypted processor execution codeset 226, via the PCI bus 224, into the accessible region 220 of the PCI memory 208. The exemplary steps may then proceed to step 308. In step 308, the encrypted PC-slave device execution code may be read out into the PC-salve device, and decrypted within the PC-slave device. For example, the decryption controller 218 may load the encrypted processor execution codeset 226, from the accessible region 220, and may perform decryption operations, which may utilize encryption keys loaded from the PCI secure processor 210 for example. The exemplary steps may then proceed to step 310. In step 310, the decrypted PC-slave device execution code may be stored and/or written into the restricted memory. For example, once the decryption controller 218 may complete decrypting the encrypted processor execution codeset 226, it may load the decrypted processor execution codeset 226 into the restricted region 222. The exemplary steps may then proceed to step 312. In step 312, a validation of the decrypted PC-slave device execution code may be performed. For example, the PCI secure processor 210 may load the decrypted PCI-slave device execution code from the restricted region 222, and may validate the processor execution codeset 226. In instances where the PCI-slave device execution code may be invalid, the process may terminate.

Returning to step 312, in instances where the PC-slave device execution code may be valid, the exemplary steps may proceed to step 314. In step 314, the PC-slave main processor may be enabled. For example, once the decrypted processor execution codeset 226 may be determined to be valid, the PCI secure processor 210 may take the PCI main processor 212 from reset and may initiate operations. The exemplary steps may then proceed to step 316. In step 316, the PC-slave device execution code may be loaded into the PC-slave main processor. For example, once the PCI main processor 212 is released from reset, the PCI main processor 212 may load the decrypted processor execution codeset 226 from the restricted region, and/or may utilize the processor execution codeset 226 to perform operations and/or functionality that may requested, in the PC system 200, via the PCI-slave device 206.

Various embodiments of the invention may comprise a method and system for secure code encryption for PC-slave devices. The PCI-slave device 206, in the PC system 200, may load and decrypt the processor execution codeset 226, which may be stored in the PC hard-drive 202. The processor execution codeset 226 may be encrypted, while stored in the PC hard-drive 202, to improve security. The PCI-slave device 206 may utilize a dedicated memory, for example the PCI memory 208, which may comprise an external direct random memory access (DRAM), that may be utilized during secure code loading of the PCI-slave device 206. The PCI memory 208 may be partitioned into the accessible region 220 and a restricted region 222 that may only be accessible by the PCI-slave device 206. The encrypted processor execution codeset 226 may be loaded, from the PC hard-drive 202, into the accessible region of the dedicated memory, via the PC software driver 204, the memory controller 216, and/or the PCI bus 224, for example. The PCI-slave device 206 may decrypt the processor execution codeset 226, utilizing internally stored encryption keys for example, and may store the decrypted processor execution codeset 226 in the restricted region 222 of the PCI memory 208. The decrypted processor execution codeset 226 may first be validated, and may then be executed from the restricted region 222 in the PCI memory 208. The PCI-slave device 206 may be reset when secure code loading is initiated, and may be taken from reset after validation of the decrypted processor execution codeset 226 may be completed successfully. The partitioning of the PCI memory 208, into the accessible region 220 and the restricted region 222, may be performed dynamically during secure code loading. The PCI-slave device 206 may comprise the PCI secure processor 210, which may enable performing and/or managing secure code loading. The PCI secure processor 210 may enable managing memory partitioning and/or access, storage and/or loading of encryption keys, managing decryption of the processor execution codeset 226, and/or resetting the PCI-slave device 206 during secure code loading.

Another embodiment of the invention may provide a machine-readable storage, having stored thereon, a computer program having at least one code section executable by a machine, thereby causing the machine to perform the steps as described herein for secure code encryption for PC-slave devices.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A method, comprising:
in a processing device comprising a slave device, said slave device comprising a secure processor:
managing by said secure processor, secure loading of execution code and/or data within said slave device, wherein said secure processor causes:
decryption of said execution code and/or data by said slave device; and
storage of said decrypted execution code and/or data in a restricted portion of a memory that is dedicated for use by said slave device, wherein said restricted portion of said dedicated memory resides outside of said slave device, said restricted portion of said dedicated memory being only accessible by said slave device.

2. The method according to claim 1, comprising validating by said secure processor said decrypted execution code and/or data.

3. The method according to claim 1, comprising blocking by said secure processor operations of a main processor in said slave device during said secure loading of execution code and/or data.

4. The method according to claim 3, comprising discontinuing said blocking after said secure processor validates said execution code and/or data.

5. The method according to claim 1, comprising storing in said secure processor encryption keys that are utilized during said decryption of said execution code and/or data.

6. The method according to claim 1, comprising loading said execution code and/or data into another portion of said dedicated memory, said another portion of said dedicated memory being accessible by said slave device and one or more other components of said processing device.

7. The method according to claim 1, comprising apportioning a plurality of portions in said dedicated memory, said plurality of portions comprising said restricted portion in said dedicated memory.

8. The method according to claim 1, comprising controlling use and/or operations of said dedicated memory during said secure loading of execution code and/or data via secure direct memory access management unit in said slave device.

9. The method according to claim 8, comprising handling said decryption of said execution code and/or data via said secure direct memory access management unit in said slave device.

10. The method according to claim 1, wherein said slave device comprises a Peripheral Component Interconnect (PCI) slave device.

11. A system, comprising:
one or more circuits for use in a slave device of a processing device, wherein said one or more circuits comprise a secure processor, said secure processor being operable to manage secure loading of execution code and/or data within said slave device, wherein said secure processor causes:
decryption of said execution code and/or data by said slave device; and
storage of said decrypted execution code and/or data in a restricted portion of a memory that is dedicated for use by said slave device, wherein said restricted portion of said dedicated memory resides outside of said slave device, said restricted portion of said dedicated memory being only accessible by said slave device.

12. The system according to claim 11, wherein said secure processor is operable to validate said decrypted execution code and/or data.

13. The system according to claim 11, wherein said secure processor is operable to block operations of a main processor in said slave device during said secure loading of execution code and/or data.

14. The system according to claim 13, wherein said secure processor is operable to discontinue said blocking after validating said execution code and/or data.

15. The system according to claim 11, wherein said secure processor is operable to store encryption keys that are utilized during said decryption of said execution code and/or data.

16. The system according to claim 11, wherein said secure processor is operable to cause loading said execution code and/or data into another portion of said dedicated memory, said another portion of said dedicated memory being accessible by said slave device and by one or more other components of said processing device.

17. The system according to claim 11, wherein said secure processor is operable to cause apportioning a plurality of portions in said dedicated memory, said plurality of portions comprising said restricted portion in said dedicated memory.

18. The system according to claim 11, wherein said secure processor is operable to control use and/or operations of said dedicated memory during said secure loading of execution code and/or data via secure direct memory access management unit in said slave device.

19. The system according to claim 18, wherein said secure direct memory access management unit in said slave device is operable to handle said decryption of said execution code and/or data.

20. The system according to claim 11, wherein said slave device comprises a Peripheral Component Interconnect (PCI) stave device.

21. A method, comprising:
in a processing device comprising a slave device, said stave device comprising a secure processor:
managing by said secure processor, secure loading of execution code and/or data within said slave device, wherein said secure processor causes:
decryption of said execution code and/or data by said slave device;
dynamically partitioning of a memory that is dedicated for use by said slave device into a restricted portion and an accessible portion, wherein said accessible portion of said dedicated memory is accessible by said slave device and one or more other components of said processing device; and
storage of said decrypted execution code and/or data in said restricted portion of said memory that is dedicated for use by said slave device, said restricted portion of said dedicated memory being only accessible by said slave device.

22. The method according to claim 21, comprising validating by said secure processor said decrypted execution code and/or data.

23. The method according to claim 21, comprising blocking by said secure processor operations of a main processor in said slave device during said secure loading of execution code and/or data.

24. The method according to claim 23, comprising discontinuing said blocking after said secure processor validates said execution code and/or data.

25. The method according to claim 21, comprising storing in said secure processor encryption keys that are utilized during said decryption of said execution code and/or data.

26. The method according to claim 21, comprising loading said execution code and/or data into another portion of said dedicated memory, said another portion of said dedicated memory being accessible by said slave device and one or more other components of said processing device.

27. The method according to claim 21, comprising apportioning a plurality of portions in said dedicated memory, said plurality of portions comprising said restricted portion in said dedicated memory.

28. The method according to claim 21, comprising controlling use and/or operations of said dedicated memory during said secure loading of execution code and/or data via secure direct memory access management unit in said slave device.

29. The method according to claim 28, comprising handling said decryption of said execution code and/or data via said secure direct memory access management unit in said slave device.

30. The method according to claim 21, wherein said slave device comprises a Peripheral Component Interconnect (PCI) slave device.

31. A system, comprising:
one or more circuits for use in a slave device of a processing device, wherein said one or more circuits comprise a secure processor, said secure processor being operable to manage secure loading of execution code and/or data within said slave device, wherein said secure processor causes:
decryption of said execution code and/or data by said slave device;
dynamically partitioning of a memory that is dedicated for use by said slave device into a restricted portion and an accessible portion, wherein said accessible portion of said dedicated memory is accessible by said slave device and one or more other components of said processing device; and
storage of said decrypted execution code and/or data in said restricted portion of said memory that is dedicated for use by said slave device, said restricted portion of said dedicated memory being only accessible by said slave device.

32. The system according to claim 31, wherein said secure processor is operable to validate said decrypted execution code and/or data.

33. The system according to claim 31, wherein said secure processor is operable to block operations of a main processor in said slave device during said secure loading of execution code and/or data.

34. The system according to claim 33, wherein said secure processor is operable to discontinue said blocking after validating said execution code and/or data.

35. The system according to claim 31, wherein said secure processor is operable to store encryption keys that are utilized during said decryption of said execution code and/or data.

36. The system according to claim 31, wherein said secure processor is operable to cause loading said execution code and/or data into another portion of said dedicated memory, said another portion of said dedicated memory being accessible by said slave device and by one or more other components of said processing device.

37. The system according to claim 31, wherein said secure processor is operable to cause apportioning a plurality of portions in said dedicated memory, said plurality of portions comprising said restricted portion in said dedicated memory.

38. The system according to claim 31, wherein said secure processor is operable to control use and/or operations of said dedicated memory during said secure loading of execution code and/or data via secure direct memory access management unit in said slave device.

39. The system according to claim 38, wherein said secure direct memory access management unit in said slave device is operable to handle said decryption of said execution code and/or data.

40. The system according to claim 31, wherein said slave device comprises a Peripheral Component Interconnect (PCI) slave device.

* * * * *

UNITED STATES PATENT AND TRADEMARK OFFICE
CERTIFICATE OF CORRECTION

PATENT NO. : 8,412,903 B2
APPLICATION NO. : 13/112801
DATED : April 2, 2013
INVENTOR(S) : Stephane Rodgers It is certified that error appears in the above-identified patent and that said Letters Patent is hereby corrected as shown below:

In the Claims:

Column 11, line 29, please replace "stave device" with --slave device--.
Column 11, line 31, please replace "stave" with --slave--.

Signed and Sealed this
Twenty-first Day of May, 2013

Teresa Stanek Rea
*Acting Director of the United States Patent and Trademark Office*